US011264641B2

(12) United States Patent
Yamada et al.

(10) Patent No.: US 11,264,641 B2
(45) Date of Patent: Mar. 1, 2022

(54) ALL-SOLID SECONDARY BATTERY, MULTILAYERED ALL-SOLID SECONDARY BATTERY, AND METHOD OF MANUFACTURING ALL-SOLID SECONDARY BATTERY

(71) Applicant: Samsung Electronics Co., Ltd., Suwon-si (KR)

(72) Inventors: Takanobu Yamada, Kanagawa (JP); Shiratsuchi Tomoyuki, Kanagawa (JP); Koji Yoshida, Kanagawa (JP); Ryo Omoda, Kanagawa (JP)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 365 days.

(21) Appl. No.: 16/244,273

(22) Filed: Jan. 10, 2019

(65) Prior Publication Data

US 2019/0214677 A1    Jul. 11, 2019

(30) Foreign Application Priority Data

Jan. 10, 2018  (JP) .............................. JP2018-002161
May 10, 2018  (KR) ........................ 10-2018-0053930

(51) Int. Cl.
*H01M 10/0562* (2010.01)
*H01M 10/0585* (2010.01)
(Continued)

(52) U.S. Cl.
CPC ....... *H01M 10/0562* (2013.01); *H01M 4/049* (2013.01); *H01M 4/38* (2013.01);
(Continued)

(58) Field of Classification Search
CPC .......... H01M 10/0525; H01M 50/403; H01M 4/661; H01M 4/485; H01M 4/525;
(Continued)

(56) References Cited

U.S. PATENT DOCUMENTS 7,759,005 B2    7/2010   Hosaka et al.
8,420,252 B2    4/2013   Shakespeare et al.
(Continued)

FOREIGN PATENT DOCUMENTS

JP    2001052683 A    2/2001
JP    2004158222 A    6/2004
(Continued)

OTHER PUBLICATIONS

Office Action for Japanese Patent Application No. 2018-002161 dated Jan. 11, 2022.

*Primary Examiner* — Gary D Harris
(74) *Attorney, Agent, or Firm* — Cantor Colburn LLP

(57) ABSTRACT

An all-solid secondary battery, including: a first current collector; a pair of first active material layers disposed on opposite sides of the first current collector; a pair of solid electrolyte layers disposed on surfaces of the pair of first active material layers; a pair of second active material layers disposed on surfaces of the pair of solid electrolyte layers; and a pair of second current collectors disposed on surfaces of the pair of second active material layers, wherein a surface of one of the pair of second current collectors opposite to a surface of one of the pair of second active material layers does not comprise protrusions having a height of greater than about 8 micrometers.

20 Claims, 7 Drawing Sheets

(51) Int. Cl.
*H01M 4/70* (2006.01)
*H01M 4/62* (2006.01)
*H01M 4/04* (2006.01)
*H01M 4/66* (2006.01)
*H01M 4/485* (2010.01)
*H01M 4/525* (2010.01)
*H01M 4/587* (2010.01)
*H01M 4/505* (2010.01)
*H01M 4/38* (2006.01)
*H01M 10/0565* (2010.01)
*H01M 50/403* (2021.01)
*H01M 10/0525* (2010.01)

(52) U.S. Cl.
CPC ........... *H01M 4/485* (2013.01); *H01M 4/505* (2013.01); *H01M 4/525* (2013.01); *H01M 4/587* (2013.01); *H01M 4/622* (2013.01); *H01M 4/661* (2013.01); *H01M 4/70* (2013.01); *H01M 10/0565* (2013.01); *H01M 10/0585* (2013.01); *H01M 50/403* (2021.01); *H01M 10/0525* (2013.01); *H01M 2300/0071* (2013.01); *H01M 2300/0082* (2013.01)

(58) Field of Classification Search
CPC ........ H01M 4/587; H01M 4/505; H01M 4/38; H01M 10/0565; H01M 10/0585; H01M 4/70; H01M 4/622; H01M 4/049; H01M 2300/0082; H01M 2300/0071; Y02E 60/10
USPC ........................................................ 429/304
See application file for complete search history.

(56) References Cited

U.S. PATENT DOCUMENTS

| | | | |
|---|---|---|---|
| 8,623,543 | B2 | 1/2014 | Sastry et al. |
| 9,118,068 | B2 | 8/2015 | Hayashi et al. |
| 9,190,658 | B2 | 11/2015 | Ryu et al. |
| 9,379,386 | B2 | 6/2016 | Miyake |
| 9,564,655 | B2 | 2/2017 | Hasegawa et al. |
| 9,634,358 | B2 | 4/2017 | Matsushita |
| 9,786,873 | B2 | 10/2017 | Neudecker et al. |
| 9,786,946 | B2 | 10/2017 | Sasaoka et al. |
| 10,074,830 | B2 | 9/2018 | Shigematsu et al. |
| 2006/0046137 | A1 | 3/2006 | Kodama |
| 2007/0015047 | A1 | 1/2007 | Hosaka et al. |
| 2008/0087789 | A1 | 4/2008 | Hyanes |
| 2008/0241665 | A1 | 10/2008 | Sano |
| 2011/0162198 | A1 | 7/2011 | Kawamoto et al. |
| 2012/0018191 | A1 | 1/2012 | Yoshida et al. |
| 2013/0149592 | A1 | 6/2013 | Hayashi et al. |
| 2014/0082931 | A1 | 3/2014 | Nishino et al. |
| 2014/0205885 | A1 | 7/2014 | Imai et al. |
| 2014/0363725 | A1 | 12/2014 | Park et al. |
| 2015/0180076 | A1 | 6/2015 | Hasegawa et al. |
| 2015/0188195 | A1 | 7/2015 | Matsushita |
| 2015/0270585 | A1 | 9/2015 | Sasaoka et al. |
| 2015/0349379 | A1 | 12/2015 | Hozumi et al. |
| 2019/0157723 | A1* | 5/2019 | Suzuki .............. H01M 10/0585 |

FOREIGN PATENT DOCUMENTS

| | | |
|---|---|---|
| JP | 2008251225 A | 10/2008 |
| JP | 2015125872 A | 7/2015 |
| JP | 2016152204 A | 8/2016 |
| JP | 2017112029 A | 6/2017 |
| JP | 2017157271 A | 9/2017 |

* cited by examiner

ALL-SOLID SECONDARY BATTERY, MULTILAYERED ALL-SOLID SECONDARY BATTERY, AND METHOD OF MANUFACTURING ALL-SOLID SECONDARY BATTERY

CROSS-REFERENCE TO RELATED APPLICATIONS

This application claims priority to and the benefit of Japanese Patent Application No. 2018-002161, filed on Jan. 10, 2018, in the Japanese Patent Office and Korean Patent Application No. 10-2018-0053930, filed on May 10, 2018, in the Korean Intellectual Property Office, and all the benefits accruing therefrom under 35 U.S.C. § 119, the contents of which are incorporated herein in their entireties by reference.

BACKGROUND

1. Field

The present disclosure relates to an all-solid secondary battery, a multilayered all-solid secondary battery, and a method of manufacturing an all-solid secondary battery.

2. Description of the Related Art

In recent years, the development of all-solid secondary batteries has been ongoing. An all-solid secondary battery includes a positive electrode active material layer, a negative electrode active material layer, and a solid electrolyte layer located between these active material layers. In the all-solid secondary battery, a solid electrolyte is used as a medium for conducting lithium ions.

Such an all-solid secondary battery including a solid electrolyte is believed to have improved energy density as compared to lithium ion batteries using a liquid electrolyte. Methods of improving the energy density of an all-solid secondary battery have included stacking a plurality of single cells in the all-solid secondary battery to reduce the number of external bodies occupying the entire battery. For example, JP 2017-157271A discloses a method of obtaining a multilayered all-solid secondary battery by pressing a pair of temporary cell bodies in which a positive electrode current collector is roughened. However, there remains a need for an all-solid secondary battery having improved properties

SUMMARY

Methods of improving the energy density of an all-solid secondary battery, have included stacking a plurality of single cells in the all-solid secondary battery. However, the present inventors have found that when a plurality of single cells of an all-solid secondary battery are simply stacked, sufficient battery characteristics are not exhibited. Specifically, at the time of charging a multilayer all-solid secondary battery, short-circuiting occurs, or good cycle characteristics are not obtained.

Accordingly, the present disclosure provides an improved all-solid secondary battery capable of being stacked as a plurality of all-solid secondary batteries without deterioration in the battery characteristics, a multilayer all-solid secondary battery obtained by stacking the all-solid secondary batteries, and a method of manufacturing the all-solid secondary battery.

Additional aspects will be set forth in part in the description which follows and, in part, will be apparent from the description, or may be learned by practice of the presented embodiments.

In order to solve the above problems, according to an aspect of an embodiment, an all-solid secondary battery includes: a first current collector; a pair of first active material layers respectively disposed on both sides of the first current collector; a pair of solid electrolyte layers respectively disposed on surfaces of the pair of first active material layers, wherein the surfaces of the pair of first active material layers are each opposite to a surface of the first current collector; a pair of second active material layers respectively disposed on surfaces of the pair of solid electrolyte layers, wherein the surfaces of the pair of solid electrolyte layers are each opposite a surface of one of the first active material layers; and a pair of second current collectors respectively disposed on surfaces of the pair of second active material layers, wherein the surfaces of the pair of second active material layers are each opposite to a surface of the solid electrolyte layers, wherein, a surface of one of the pair of second current collectors that is opposite to a surface of one of the pair of second active material layers, does not comprise protrusions having a height of greater than about 8 micrometers, and wherein a surface of the other one of the pair of second current collectors that is opposite to a surface of the other one of the pair of second active material layers, comprises protrusions having a height of more than 8.0 μm exist at a density of about 0 to 1 per 1 $cm^2$.

In this regard, it is possible to stack a plurality of all-solid secondary batteries without deterioration of battery characteristics.

Protrusions having a height of greater than about 5 μm may not be present on a surface of the one of the pair of second current collectors.

In this regard, it is possible to more reliably suppress the deterioration of characteristics of the all-solid secondary battery during stacking.

Protrusions having a height of greater than about 10 μm may not be present on a surface of the other one of the pair of second current collectors.

In this regard, it is possible to more reliably suppress the deterioration of characteristics of the all-solid secondary battery during stacking.

Each of the first active material layers may be a positive electrode active material layer, and each of the second active material layers may be a negative electrode active material layer.

In this regard, it is possible to stack a plurality of all-solid secondary batteries without deterioration of battery characteristics.

Each of the second active material layers may include a negative electrode active material which forms an alloy with lithium, a negative electrode active material which forms a compound with lithium, or a combination thereof, and lithium metal may precipitate on each one of the pair of second active material layers through the negative electrode active material during charging.

In this regard, the battery characteristics of the all-solid secondary battery are improved. Further, each one of the pair of second active material layers is vulnerable to the shape of the adjacent relatively thin second current collector, but this influence may be prevented in the present disclosure.

When each of the first active material layers is a positive electrode active material layer and each of the second active material layers is a negative electrode active material layer, the ratio of a charging capacity of one of the pair of first active material layers to a charging capacity of one of the pair of second active material layers may be represented by Formula (1):

$$0.002 < b/a < 0.5 \quad \text{Formula (1)}$$

wherein, a is a charging capacity (milliampere hours, mAh) of one of the pair of first active material layers, and b is a charging capacity (mAh) of one of the pair of second active material layers.

In this regard, the battery characteristics of the all-solid secondary battery are improved. Further, each of the second active material layers is vulnerable to the shape of the adjacent relatively thin second current collector, but this influence may be prevented in the present disclosure.

Each of the second active material layers may include amorphous carbon, gold, platinum, palladium, silicon, silver, aluminum, bismuth, tin, zinc, or a combination thereof.

In this regard, the battery characteristics of the all-solid secondary battery may be improved.

According to an aspect of another embodiment, a multilayered all-solid secondary battery includes: at least one insulating layer; and a plurality of the all-solid secondary batteries, wherein the plurality of the all-solid secondary batteries are disposed such that the at least one insulating layer is interposed between the all-solid secondary batteries, wherein the all-solid secondary batteries are disposed such that one of the pair of second current collectors of one of the all-solid secondary batteries faces one of the pair of the second current collectors of another one of the all-solid secondary batteries.

In this regard, it is possible to stack a plurality of all-solid secondary batteries without deterioration of battery characteristics.

According to an aspect of another embodiment, there is provided a method of manufacturing an all-solid secondary battery including a first current collector, a pair of first active material layers respectively disposed on opposite sides of the first current collector, a pair of solid electrolyte layers respectively disposed on surfaces of the pair of first active material layers, wherein the surfaces of the pair of first active material layers are each opposite to a surface of the first current collector, a pair of second active material layers respectively disposed on surfaces of the pair of solid electrolyte layers, wherein the surfaces of the pair of solid electrolyte layers are each opposite to a surface of one of the pair of first active material layers, and a pair of second current collectors respectively disposed on surfaces of the pair of second active material layers, wherein the surfaces of the pair of second active material layers are each opposite to a surface of a surface of the pair of solid electrolyte layers, the method including: forming each one of the pair of solid electrolyte layers on one of the pair of first active material layers or on one of the pair of second active material layers; and disposing a support on a side of a laminate in which the first current collector, the pair of first active material layers, the pair of solid electrolyte layer, the pair of second active material layers, and the pair of second current collectors are stacked, and isostatically pressing the laminate.

In this regard, it is possible to stack a plurality of all-solid secondary batteries without deterioration of battery characteristics.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
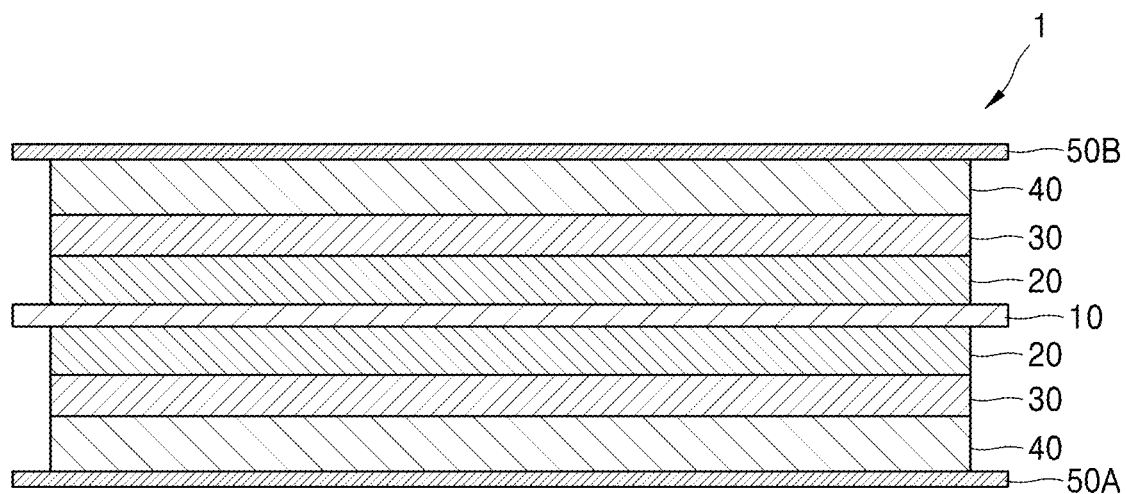
FIG. 1 is a schematic cross-sectional view illustrating an all-solid secondary battery according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims Hereinafter, embodiments will be described in detail by explaining exemplary embodiments with reference to the accompanying drawings. In addition, like reference numerals in the present specification and drawings denote like elements, and thus their description will be omitted.

<1. Examination by the Present Inventors>

A plurality of all-solid secondary batteries are stacked into a single battery (single cell), in order to examine a reason why battery characteristics of the single battery are not sufficiently exhibited. The examination is performed using an all-solid secondary battery 200 shown in FIG. 7.

Figure 7:
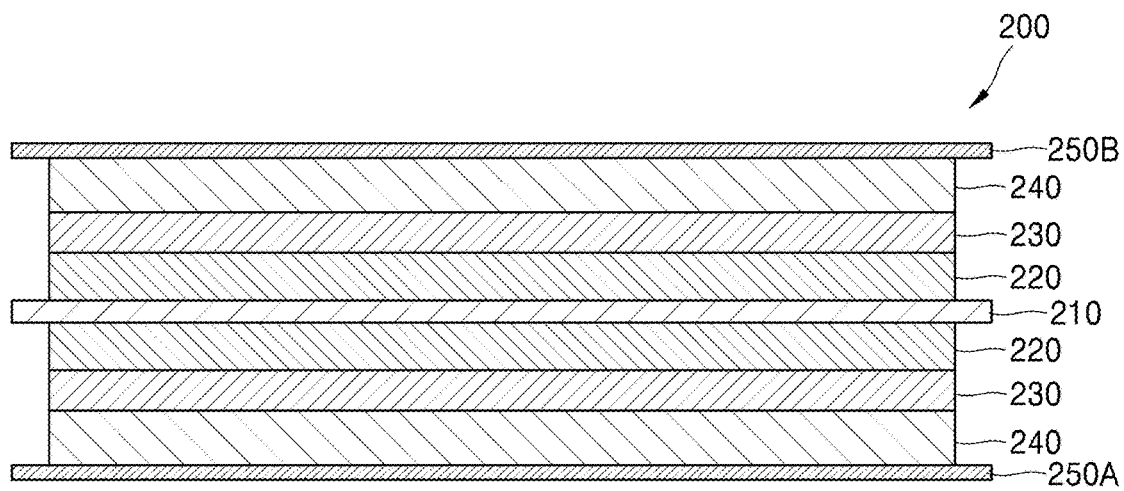
FIG. 7 is a schematic cross-sectional view illustrating the all-solid secondary battery of the prior art and examined by the present inventors.

The all-solid secondary battery 200 shown in FIG. 7 includes a positive electrode current collector 210, a pair of positive electrode active material layers 220 formed on both sides of the positive electrode current collector 210, a pair of solid electrolyte layers 230 respectively formed on the positive electrode active material layers 220, a pair of negative electrode active material layers 240 respectively formed on the solid electrolyte layers 230, and a pair of negative electrode current collectors 250A and 250B respectively formed on the negative electrode active material layers 240.

In the manufacturing of the all-solid secondary battery 200, sheet-shaped solid electrolyte layers 230 formed on a nonwoven fabric were used. As shown in FIG. 7, a laminate in which the respective layers were stacked is disposed to allow the negative electrode current collector 250A to be in contact with a support plate (not shown), and is subjected to isotactic pressing (isotactically pressed), thereby manufacturing the all-solid secondary battery 200.

Figure 8:
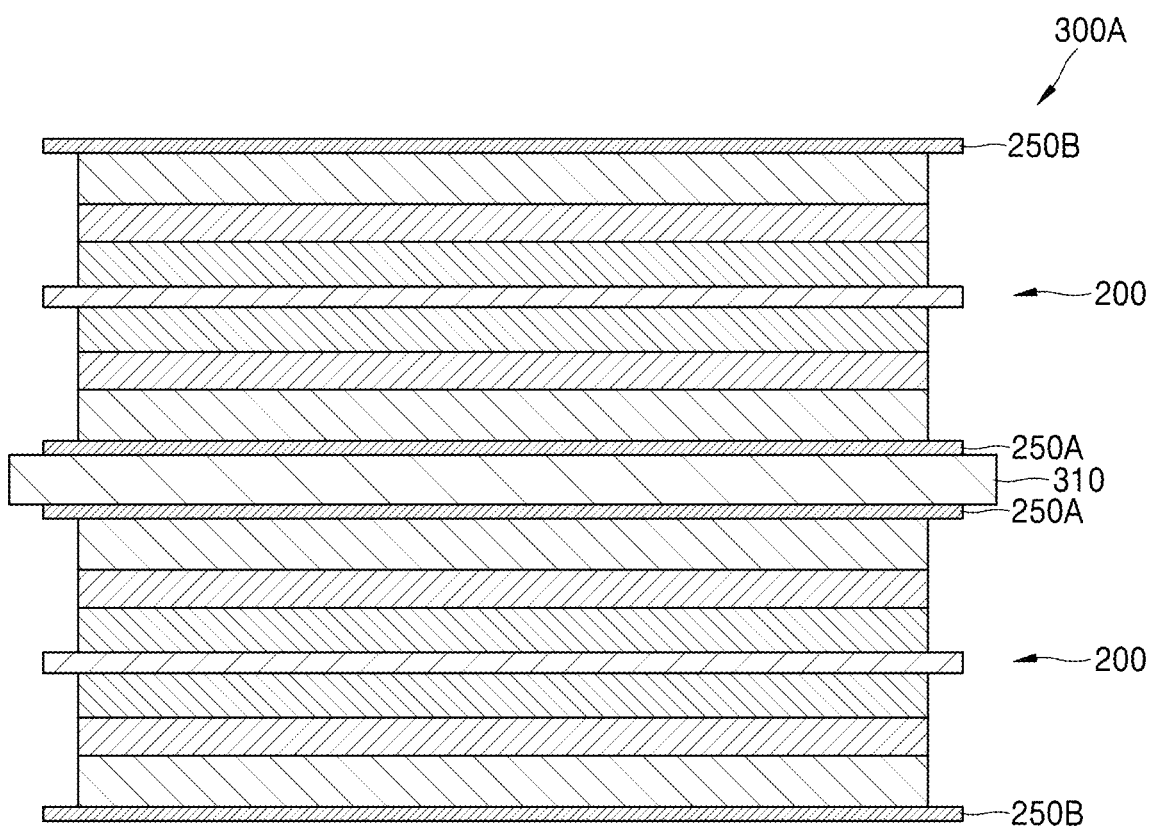
FIG. 8 is a schematic cross-sectional view illustrating a multilayered all-solid secondary battery of the prior art and examined by the present inventors.
Figure 9:
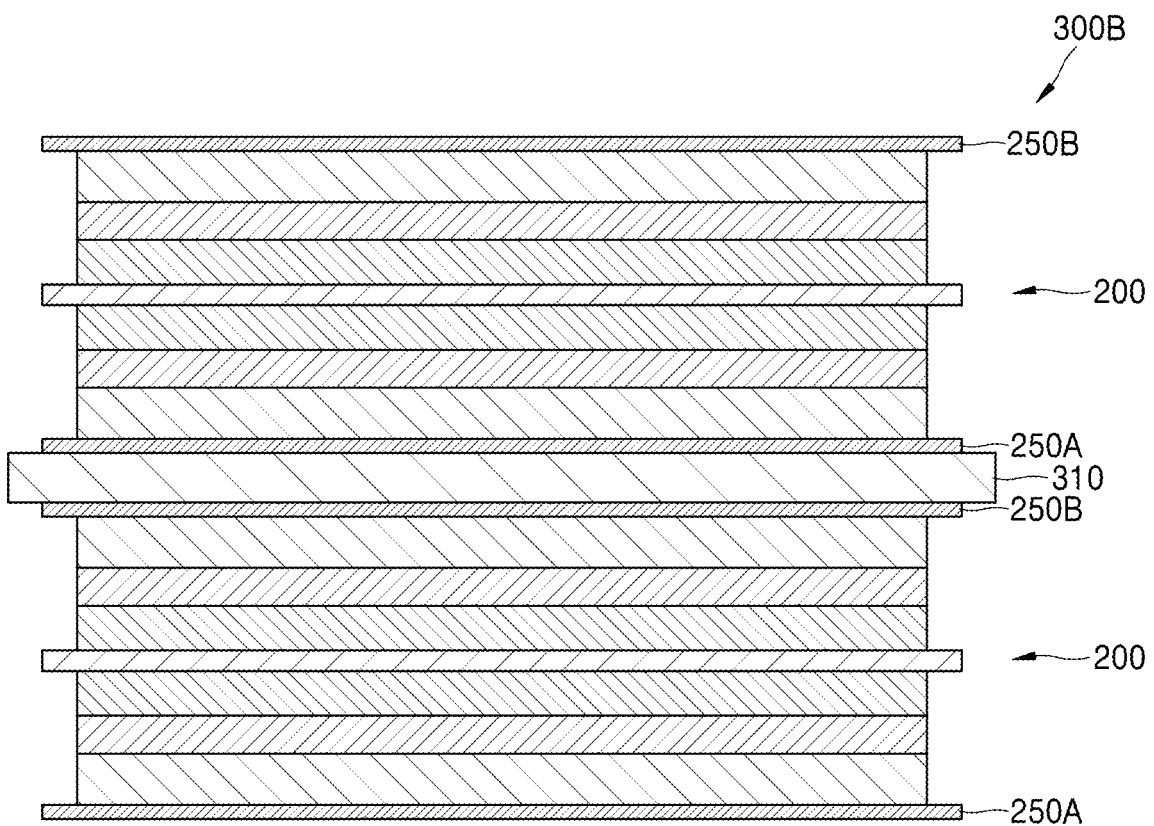
FIG. 9 is a schematic cross-sectional view illustrating another multilayered all-solid secondary battery of the prior art and examined by the present inventors.

As shown in FIG. 8, two all-solid secondary batteries 200 are stacked and pressed together, with an insulating layer 310 between the all-solid secondary batteries 200 such that the negative electrode current collectors 250A of each of the all-solid secondary batteries 200 face each other, so as to manufacture a multilayered all-solid secondary battery 300A including two all-solid secondary batteries 200. Further, as shown in FIG. 9, two all-solid secondary batteries 200 are stacked and pressed together, with an insulating layer 310 between the all-solid secondary batteries 200 such that the negative electrode current collector 250A of one all-solid secondary battery 200 faces the negative electrode current collector 250B of the other all-solid secondary battery 200, so as to manufacture a multilayered all-solid secondary battery 300B having two all-solid secondary batteries 200.

Thereafter, the battery characteristics of the multilayered all-solid secondary batteries 300A and 300B were evaluated. As a result, the multilayered all-solid secondary battery 300A may obtain sufficient excellent cycle characteristics without deteriorating the battery characteristics of each of the all-solid secondary batteries 200, and does not cause a short-circuit. In contrast, the multilayered all-solid secondary battery 300B may not obtain sufficient excellent cycle characteristics, and causes a short-circuit early in the life of the multilayered all-solid secondary battery 300B.

Accordingly, without being limited by theory, it is understood that there is a difference in the battery characteristics of the multilayered all-solid secondary batteries 300A and 300B which may be attributed to the stacking direction of the all-solid secondary battery 200 and the surface state of the negative electrode current collectors 250A and 250B. That is, the all-solid secondary battery 200 is manufactured by isostatic pressing, and, in this case, the surface shapes of the negative electrode current collectors 250A and 250B may be different. Specifically, the negative electrode current collector 250A supported on the support plate tends to be smooth according to the shape of the support plate. In contrast, since the negative electrode current collector 250B is not supported on the support plate, the metal foil constituting the negative electrode current collector 250B tends to have irregularities due to the shape of the negative electrode active material layer 240 and the solid electrolyte layer 230 inside of the all-solid secondary battery 200.

Therefore, it has been found that, when the all-solid secondary batteries 200 of the multilayered all-solid secondary battery 300B are stacked, and the negative electrode current collector 250B having irregularities is disposed outside another all-solid secondary battery, the irregularities of the corresponding negative electrode current collector 250B physically influence the adjacent all-solid second battery 200. Meanwhile, it has been advantageously discovered that in the multilayered all-solid secondary battery 300A, when flat negative electrode current collectors are stacked to face each other, the influence on the adjacent all-solid secondary battery 200 is suppressed, and thus the battery characteristics of each of the all-solid secondary batteries 200 are sufficiently maintained.

However, when the all-solid secondary battery 200 is manufactured by isostatic pressing, only the planar negative electrode current collector 250A is formed by the support plate. Therefore, when three or more all-solid secondary batteries are stacked, the negative electrode current collector 250B, having irregularities, is in contact with the adjacent all-solid secondary battery 200 through the insulating layer 310. Thus, it has been difficult to simply stack three or more all-solid secondary batteries 200.

Further, a method of flattening both sides of the all-solid secondary battery 200 by arranging the support plate on both sides thereof may also be considered. However, when the support plate is disposed on both sides, the support plate may be used only once by isotactic pressing, so that this method is not practical in terms of cost.

Under such circumstances, the present inventors have studied the shape of a current collector and a method of manufacturing all-solid secondary battery including such a current collector in order to stack three or more all-solid secondary batteries, thereby attaining the present disclosure.

<Configurations of all-Solid Secondary Battery and Multilayered all-Solid Secondary Battery>

Figure 2:
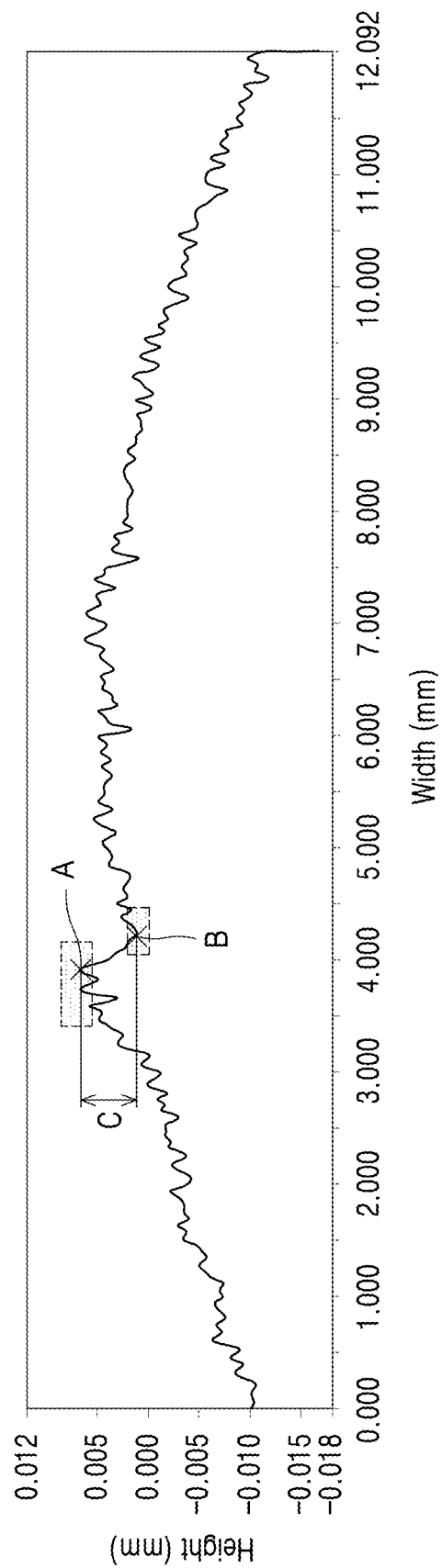
FIG. 2 is a graph of thickness (millimeters, mm) versus width (mm) showing cross-sectional analysis of a current collector plate for explaining a method of evaluating the uneven thickness of the current collecting plate.
Figure 3:
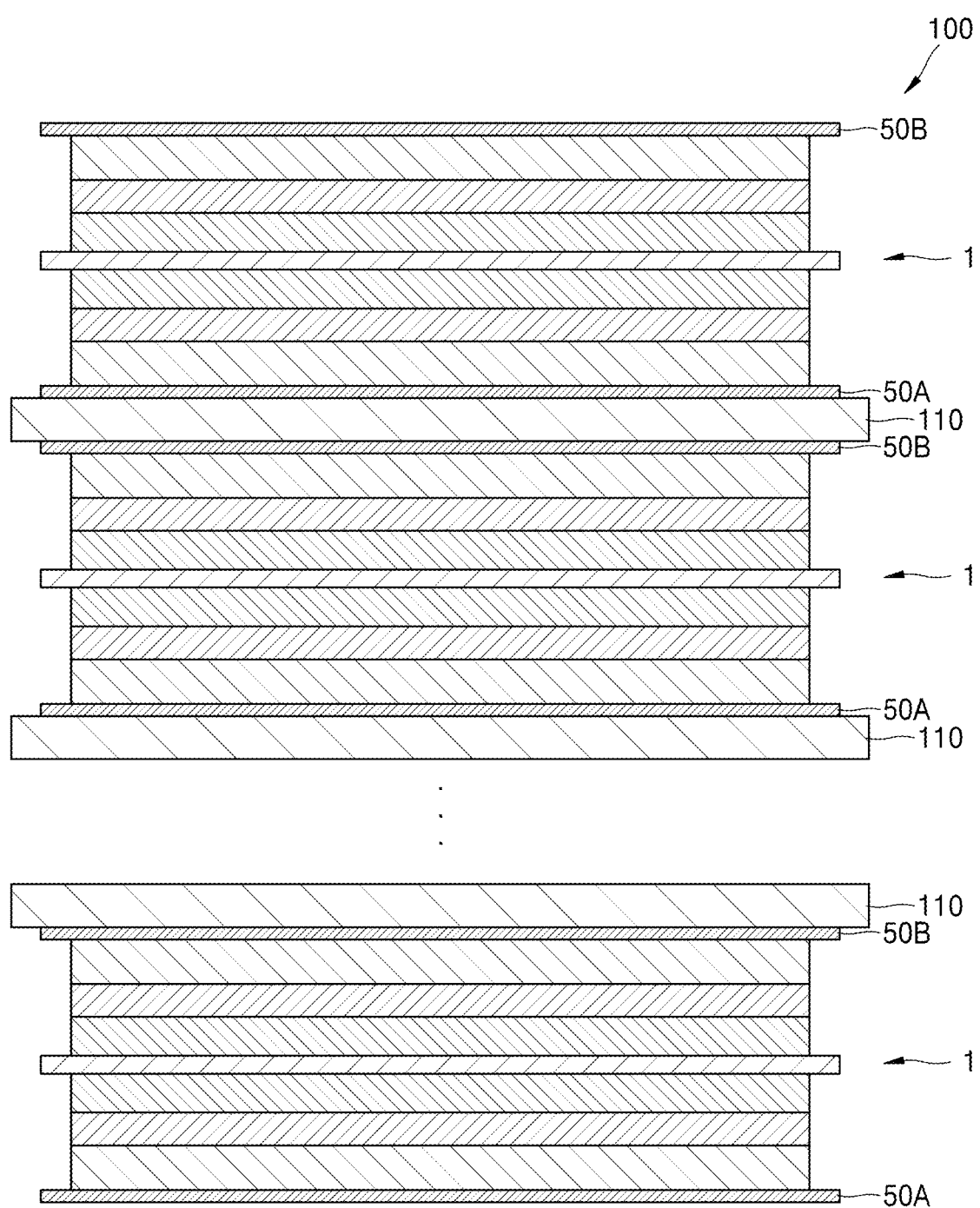
FIG. 3 is a schematic cross-sectional view illustrating a method of manufacturing a multilayered all-solid secondary battery, according to an embodiment.

Next, an all-solid secondary battery and a multilayered all-solid secondary battery according to the present embodiment will be described. FIG. 1 is a schematic cross-sectional view illustrating an all-solid secondary battery according to an embodiment of the present disclosure. FIG. 2 is a graph showing cross-sectional analysis of a current collector plate for explaining a method of evaluating the unevenness of the current collector plate. FIG. 3 is a schematic cross-sectional view illustrating a method of manufacturing a multilayered all-solid secondary battery according to an embodiment of the present disclosure.

[2.1. All-Solid Secondary Battery]

As shown in FIG. 1, an all-solid secondary battery 1 according to the present embodiment includes a positive electrode current collector (first current collector) 10; a pair of positive electrode active material layers (first active material layers) 20 formed on both sides of the positive electrode current collector 10; a pair of solid electrolyte layers 30 formed on the pair of positive electrode active material layers 20; a pair of negative electrode active material layers (second active material layers) 40 formed on the pair of solid electrolyte layers 30; and a pair of negative electrode current collectors (second current collectors) 50A and 50B formed on the pair of negative electrode active material layers 40.

In the present embodiment, protrusions having a height of greater than about 8 micrometers ($\mu m$) are not present (i.e., do not exist) on the surface of the negative electrode current collector 50A which is opposite to the surface of the negative electrode active material layer 40. In contrast, protrusions having a height of greater than about 8.0 $\mu m$ are present at a density of 0 to about 1 per square centimeter (one square $cm^2$), that is, 1.0 or less per $cm^2$, on the surface of the second current collector 50B, which is opposite to the negative electrode active material layer 40.

Thus, when the plurality of all-solid secondary batteries 1 are stacked to obtain a multilayered all-solid secondary battery 100, the battery characteristics of the multilayered all-solid secondary battery 100 may be excellent. That is, for example, even when three or more all-solid secondary batteries 1 are stacked, it is possible to prevent the deterioration in battery characteristics of each of the all-solid secondary batteries 1 of the multilayered all-solid secondary battery 100.

Specifically, when a single all-solid secondary battery 1 is stacked on another all-solid secondary battery 1, the battery characteristics of each of the all-solid secondary batteries 1 of the obtained multilayered all-solid secondary battery 100 are not deteriorated even when the relatively uneven negative electrode current collector 50B is disposed on the smooth negative electrode current collector 50A of an adjacent all-solid secondary battery 1. Therefore, when the adjacent all-solid secondary batteries are stacked together such that the negative electrode current collectors 50A and 50B face each other, three or more all-solid secondary batteries may be stacked while simultaneously preventing the deterioration in battery characteristics of each of the all-solid secondary batteries 1.

In contrast, in the all-solid secondary battery 200 in the related prior art, one negative electrode current collector 250A is flat, but the other negative electrode current collector 250B is very uneven. Therefore, in the case where the negative electrode current collector 250A and the negative electrode current collector 250B face each other when stacking a plurality of all-solid secondary batteries 200, the battery characteristics are deteriorated. On the other hand, when the all-solid secondary batteries 200 are stacked such that the negative electrode current collectors 250A face each other, the deterioration of battery characteristics may be prevented. However, it is impossible to stack three or more all-solid secondary batteries 200 such that only the negative electrode current collectors 250A face each other.

Further, the present inventors have advantageously discovered the above-described negative electrode current collectors 50A and 50B having a predetermined surface state may be prepared by a method to be described later. In the general all-solid secondary battery in the related art, it is difficult to obtain the above-described negative electrode current collector having a predetermined surface state by isostatic pressing.

As described above, in the present embodiment, protrusions having a height of greater than about 8 $\mu m$ may not be present (i.e., do not exist) on the surface of the negative electrode current collector 50A which is opposite to the surface of the negative electrode active material layer 40. For example, protrusions having a height of greater than 7 $\mu m$ may not be present. For example, protrusions having a height of greater than 5 $\mu m$ may not be present. For example, protrusions having a height of greater than 3 $\mu m$ may not be present. In this way, when the all-solid secondary batteries 1 are stacked on one another, the battery characteristics of each of the all-solid secondary batteries 1 are more reliably exhibited.

As described above, in the present embodiment, protrusions having a height of greater than about 8 $\mu m$ may be present at a density of 0 to about 1 per square centimeter ($cm^2$) on the surface of the negative electrode current collector 50A which is opposite to the surface of the negative electrode active material layer 40, however, protrusions having a height of greater than about 10 $\mu m$ may not be present. For example, protrusions having a height of greater than 8 $\mu m$ may be present at a density of 0 to about 0.8 per cm². For example, protrusions having a height of greater than 8 μm may be present at a density of 0 to about 0.75 per cm². In this way, when the all-solid secondary batteries 1 are stacked, the battery characteristics of each of the all-solid secondary batteries 1 are more reliably exhibited.

The height of the protrusions on the surface of the negative electrode current collectors 50A and 50B may be measured as follows. First, the three-dimensional shapes of the surfaces of the negative electrode current collectors 50A and 50B are measured by optical measurement system VR-3200 (Keyence Corporation) to obtain a measure of the surface roughness of the negative electrode. The measurement of the three-dimensional shapes may be performed by a commercially available optical three-dimensional shape measuring device, for example, the curved surface fine shape measurement system VR-3200 of KEYENCE CORPORATION. Next, a reference plane is set by the three-dimensional shape information obtained from the three-dimensional measurement data. The reference plane is set by selecting the entire measured area and estimating the plane by the least squares method in the area of the designated height image shape.

Next, the presence of a protrusion(s) on the surface may be used as a measure of surface roughness. The presence of the protrusion is determined from the measurement data of the three-dimensional shape of the surface in which the reference plane is set, and the height of the protrusion is measured. For example, with reference to FIG. 2, the height of the protrusion may be defined as a distance C from point A at the top of the sectional curve of the measurement data of the three-dimensional shape to the point B where the width in monotonic decrease of the height at the top becomes negative. For example, as shown in FIG. 2, the difference in the height between the value at the top point A to the value at the lowest point B among all of the points where the width in monotonic decrease of the height at the top becomes negative, may be defined as the height of the protrusion. Further, since the surfaces of the negative electrode current collectors 50A and 50B are two-dimensional in the plane direction, the point where the width in monotonic decrease of the height at the top portion becomes negative exists as a closed curve. In this case, the lowest point in the closed curve may be a reference point for measuring the height of the top.

Hereinafter, the configuration of each layer will be described.

(Positive Electrode Current Collector)

The positive electrode current collector 10 is formed of a sheet-shaped conductive material. The positive electrode current collector 10 may be a plate-like body or foil-like body including stainless steel, titanium (Ti), nickel (Ni), aluminum (Al), an alloy thereof, or a combination thereof. Further, the positive electrode current collector 10 may be connected to a wiring through a terminal electrode tab (not shown) at the time of using the all-solid secondary battery.

(Positive Electrode Active Material Layers)

The positive electrode active material layers 20 may be disposed on opposite (both) sides of the positive electrode current collector 10. The positive electrode active material layer may include a positive electrode active material and a solid electrolyte. The solid electrolyte included in the positive electrode active material layers 20 may be the same as or different from the solid electrolyte included in the solid electrolyte layer 30. Details of the solid electrolyte will be described in the following section of the solid electrolyte layer 30.

The positive electrode active material may be a positive electrode active material capable of reversibly absorbing and discharging lithium ions.

For example, the positive electrode active material may include a salt such as lithium cobalt oxide (LCO), lithium nickel oxide, lithium nickel cobalt oxide, lithium nickel cobalt aluminum oxide (NCA), lithium nickel cobalt manganese oxide (NCM), lithium manganate, and lithium iron phosphate, nickel sulfide, copper sulfide, sulfur, iron oxide, and vanadium oxide. These positive electrode active materials may be used alone, or as a combination comprising at least one of the foregoing.

Further, the positive electrode active material layer may include a lithium salt of a transition metal oxide having a layered rock salt type structure, among the aforementioned lithium salts. Here, the "layered shape" represents a thin sheet shape. Further, the "rock salt type structure" represents a sodium chloride type structure, and specifically represents a structure in which face-centered cubic lattices formed by respective positive and negative ions are arranged such that the corners of the unit lattice are staggered only by ½.

Examples of the lithium salt of the transition metal oxide having such a layered rock salt type structure may include a lithium salt of ternary transition metal oxide, such as LiNi$_x$Co$_y$Al$_z$O$_2$ (NCA) or LiNi$_x$Co$_y$Mn$_z$O$_2$ (NCM), where $0<x<1$, $0<y<1$, $0<z<1$, and $x+y+z=1$.

When the positive electrode active material includes the a lithium salt of a ternary transition metal oxide having a layered rock salt type structure, the energy density and thermal stability of the all-solid secondary battery 1 may be improved.

The positive electrode active material may include a coating layer. Any coating layer may be used as long as it is known as the coating layer of the positive electrode active material of the all-solid secondary battery of the present embodiment. For example, the coating layer may be formed of $Li_2O$—$ZrO_2$.

Further, when positive electrode active material is formed of the lithium salt of the ternary transition metal oxide, such as NCA or NCM, and includes nickel (Ni), the capacity density of the all-solid secondary battery 1 is increased, and thus the metal elution from the positive electrode active material in the charged state may be reduced. As a result, the long-term stability and cycle characteristics of the all-solid secondary battery 1 in the charged state may be improved.

The shape of the positive electrode active material may be, for example, a particle shape such as a sphere or an ellipse. The particle size of the positive electrode active material is not particularly limited, and may be in a range applicable to the positive electrode active material of the all-solid secondary battery. The content of the positive electrode active material in the positive electrode active material layer 20 is not particularly limited, and may be in a range applicable to the positive electrode active material layer of the all-solid secondary battery in the related art.

In addition to the above-described positive electrode active material and solid electrolyte, additives such as a conducting agent, a binder, a filler, a dispersant, and an ion conducting agent may be combined with the positive electrode active material layer 20 as appropriate.

Examples of the conducting agent that may be combined with the positive electrode active material layer 20 may include graphite, carbon black, acetylene black, ketjen black, carbon fiber, metal powder, or a combination thereof. Examples of the binder that may be combined with the positive electrode active material layer 20 may include styrene butadiene rubber (SBR), polytetrafluoroethylene, polyvinylidene fluoride (PVdF), polyethylene, or a combination thereof. The filler, dispersant, and ion conducting agent that may be combined with the positive electrode active material layer 20, may be any material suitable for use in an electrode of a lithium ion secondary battery.

(Solid Electrolyte Layer)

The solid electrolyte layer 30 is disposed between the positive electrode active material layer 20 and the negative electrode active material layer 40, and includes a solid electrolyte.

The solid electrolyte includes, for example, a sulfide-containing (sulfide-based) solid electrolyte material. Examples of the sulfide-based solid electrolyte material may include $Li_2S$—$P_2S_5$, $Li_2S$—$P_2S_5$—LiX (X is a halogen element such as I or Cl), $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$ (m, n is positive integer, Z is Ge, Zn or Ga), $Li_2S$—$GeS_2$, $Li_2S$—$SiS_2$—$Li_3PO_4$, $Li_2S$—$SiS_2$-$Li_pMO_q$ (p, q is positive integer, M is P, Si, Ge, B, Al, Ga or In), or a combination thereof. Here, the sulfide-based solid electrolyte material is prepared by treating a starting material (for example, $Li_2S$, $P_2S_5$, etc.) by a melt quenching method or a mechanical milling method. After this treatment, additional heat treatment may be performed. The solid electrolyte may be amorphous or crystalline, and may also be a mixed form thereof.

Among the sulfide-based solid electrolyte materials, the solid electrolyte material includes lithium (Li), sulfur (S), silicon (Si), phosphorus (P), boron (B), or a combination thereof. As a result, the lithium conductivity of the solid electrolyte layer may be improved, and the battery characteristics of the all-solid secondary battery 1 may be improved. In particular, the solid electrolyte material includes at least sulfur (S), phosphorus (P), and lithium (Li) as components, and in some embodiments, is a solid electrolyte containing $Li_2S$—$P_2S_5$.

Here, when a solid electrolyte material containing $Li_2S$—$P_2S_5$ is used as the sulfide-based solid electrolyte material forming the solid electrolyte, the mixed molar ratio of $Li_2S$ to $P_2S_5$ may be, for example, in the range of $Li_2S$:$P_2S_5$ of 50:50 to 90:10. The solid electrolyte layer 30 may further include a binder. Examples of the binder included in the solid electrolyte layer 30 may include styrene butadiene rubber (SBR), polytetrafluoroethylene, polyvinylidene fluoride, polyethylene, or a combination thereof. The binder in the solid electrolyte layer 30 may be the same as or different from the binder included in the positive electrode active material layer 20.

(Negative Electrode Active Material Layer)

The negative electrode active material layer 40 is disposed on the solid electrolyte layer 30. In the present embodiment, the negative electrode active material layer 40 may include a negative electrode active material forming an alloy with lithium, a negative electrode active material forming a compound with lithium, or a combination thereof. The negative electrode active material layer 40 including such a negative electrode active material, may be configured such that metal lithium is precipitated on one side or both sides of the negative electrode active material layer 40.

First, at the beginning of charging, the negative electrode active material in the negative electrode active material layer 40 may form an alloy and/or a compound with lithium thereby allowing lithium to be absorbed in the negative electrode active material layer 40. Then, when the capacity of the negative electrode active material layer 40 is exceeded, lithium metal is precipitated on one side or both sides of the negative electrode active material layer 40. This precipitated lithium metal forms a metal layer on the one or both sides of the negative electrode active material layer. Since the metal layer is formed by the diffusion of the lithium through the negative electrode active material forming an alloy and/or a compound with lithium, the metal layer may be uniformly formed along the surfaces of the negative electrode active material layer 40 instead of forming a dendritic body. At the time of discharging, the negative electrode active material layer 40 and the lithium metal of the metal layer are ionized and move toward the positive electrode active material layer 20. As a result, since the lithium metal may be used as the negative electrode active material, energy density is improved.

When the metal layer is formed between the negative electrode active material layer 40 and the negative electrode current collector 50, the metal layer is coated with the negative electrode active material layer 40. At this time, the negative electrode active material layer 40 functions as a protective layer for the metal layer. In this case, the short circuit and capacity reduction of the all-solid secondary battery 1 are suppressed, and the characteristics of the all-solid secondary battery are improved.

To enable the precipitation of lithium metal in the negative electrode active material layer 40, there is a method of increasing the charging capacity of the positive electrode active material layer 20 to be greater than the charging capacity of the negative electrode active material layer 40. Specifically, the ratio of the charging capacity (mAh) of the positive electrode active material layer 20 to the charging capacity (mAh) of the negative electrode active material layer 40 may satisfy the following Formula (1):

$$0.002 < b/a < 0.5 \quad \text{Formula (1)}$$

Where in Formula (1), a is the charging capacity of the positive electrode active material layer and b is the charging capacity of the negative electrode active material layer.

In Formula (1), when the capacity ratio is 0.002 or less, depending on the configuration of the negative electrode active material layer 40, the negative electrode active material layer 40 does not sufficiently mediate the precipitation of metal lithium, and thus the metal layer may not be formed properly. Further, when the metal layer is formed between the negative electrode active material layer 40 and the negative electrode current collector 50A or 50B, the negative electrode active material layer 40 may not sufficiently function as a protective layer. The capacity ratio may be 0.01 or greater, for example, 0.03 or greater.

When the capacity ratio is 0.5 or greater, the negative electrode active material layer 40 stores most of lithium at the time of charging, and the metal layer may not be uniformly formed depending on the configuration of the negative electrode active material layer 40. The capacity ratio may be 0.2 or less, for example, 0.1 or less.

Examples of the negative electrode active material for realizing the above function may include amorphous carbon, gold (Au), platinum (Pt), palladium (Pd), silicon (Si), silver (Ag), aluminum (Al), bismuth (Bi), or a combination thereof. Here, examples of the amorphous carbon may include carbon black, acetylene black, furnace black, ketjen black, graphene, or a combination thereof.

The shape of the negative electrode active material is not particularly limited, and may be, for example, a granular shape. For example, the negative electrode active material layer may constitute a layer in which the negative electrode active material is uniformly distributed, for example, a plating layer. In the former case, lithium ions pass through the gaps between the segmented granular negative electrode active materials to form lithium metal layers between the negative electrode active material layer 40 and the negative electrode current collector 50A, and between the negative electrode active material layer 40 and the negative electrode current collector 50B. Meanwhile, in the latter case, a lithium metal layer is precipitated between the negative electrode active material layer 40 and the solid electrolyte layer 30.

The specific surface area of amorphous carbon in the negative electrode active material layer 40, as measured by a nitrogen gas adsorption method, may be 100 meters per gram (m$^2$/g) or less. The negative electrode active material layer 40 may include a mixture of amorphous carbon having a low specific surface area and amorphous carbon having a high specific surface area, for example, a high specific surface area of 300 m$^2$/g or greater as measured by a nitrogen gas adsorption method.

The negative electrode active material layer 40 may include one type of the negative electrode active material, or may include two or more types of the negative electrode active material. For example, the negative electrode active material layer 40 may include only amorphous carbon as the negative electrode active material, or may include gold, platinum, palladium, silicon, silver, aluminum, bismuth, tin, antimony, zinc, or a combination thereof, as the negative electrode active material. Further, the negative electrode active material layer 40 may include a mixture of amorphous carbon and at least one of gold, platinum, palladium, silicon, silver, aluminum, bismuth, tin, antimony, zinc, and a combination thereof. The mixing weight ratio of amorphous carbon to metal may be 1:1 to 1:3. When the negative electrode material is composed of such materials, thereby further improving the characteristics of the all-solid secondary battery 1.

Here, when the negative electrode active material includes at least one of gold, platinum, palladium, antimony, silicon, silver, aluminum, bismuth, tin, zinc, or a combination thereof together with amorphous carbon, the particle size of the negative electrode active material may be 4 μm or less. In this case, the characteristics of the all-solid secondary battery 1 may be further improved.

Further, when a material capable of forming an alloy with lithium, for example, a material including gold, platinum, palladium, antimony, silicon, silver, aluminum, bismuth, tin, zinc, or a combination thereof is used as the negative electrode active material, the negative electrode active material layer 40 may be a metal layer thereof. For example, the metal layer may be a plating layer.

Here, the charging capacity of the positive electrode active material layer 20 is determined by multiplying the charging capacity density (mAh/g) of the positive electrode active material by the mass of the positive electrode active material in the positive electrode active material layer 20. When several types of positive electrode active materials are used, the charging capacity density multiplied by the mass value may be calculated for each positive electrode active material, and the sum of these values may be used as the charging capacity of the positive electrode active material layer 20. The charging capacity of the negative electrode active material layer 40 is also calculated in the same manner. That is, the charging capacity of the negative electrode active material layer 40 is obtained by multiplying the charging capacity density (mAh/g) of the negative electrode active material by the mass of the negative electrode active material in the negative electrode active material layer 40. When several types of negative electrode active materials are used, the charging capacity density multiplied by the mass value may be calculated for each negative electrode active material, and the sum of these values may be used as the charging capacity of the negative electrode active material layer 40. Here, the charging capacity density of each of the positive electrode active material and the negative electrode active material is a capacity estimated using an all-solid half cell in which lithium metals are used as opposite poles. The charging capacity of each of the positive electrode active material layer 20 and the negative electrode active material layer 40 is directly measured by using the all-solid half cell. The charging capacity density is calculated by dividing the charging capacity by the mass of each of the active materials.

The negative electrode active material layer 40 may include a binder as needed. Examples of the binder may include styrene butadiene rubber (SBR), polytetrafluoroethylene, polyvinylidene fluoride, polyethylene oxide, or a combination thereof. The binder may include only one of these materials, or may include two or more thereof. As such, when the negative electrode active material layer 40 includes the binder and the negative electrode active material has a granular shape, it is possible to prevent the separation of the negative active material. When the negative electrode active material layer 40 includes the binder, the content of the binder is, for example, about 0.3 weight percent (wt %) to about 20 wt %, for example, about 1.0 wt % to about 15 wt %, and for example, about 3.0 wt % to about 15 wt %, based on the total weight of the negative electrode active material layer 40.

The negative electrode active material layer 40 may further contain an additive suitable for use in an all-solid secondary battery, such as, for example, a filler, a dispersant, and an ion conducting agent.

The thickness of the negative electrode active material layer 40 is not particularly limited when the negative electrode active material is granular, but may be, for example, about 1.0 μm to about 20 μm, and for example, about 1.0 μm to about 10 μm. In this case, the resistance value of the negative electrode active material layer 40 may be sufficiently reduced while sufficiently obtaining the above-described effect of the negative electrode active material layer 40, so that the characteristics of the all-solid secondary battery may be sufficiently improved.

Meanwhile, the thickness of the negative electrode active material layer 40 may be, for example, about 1.0 nanometer (nm) to about 100 nm when the negative electrode active material forms a uniform layer. In this case, the upper limit of the thickness of the negative electrode active material layer 40 may be for example, about 95 nm, for example, about 90 nm, and for example, about 50 nm.

The negative electrode active material layer 40 having the above-described structure contributes greatly to the improvement of the battery characteristics while being susceptible to the physical shapes of the relatively thin and adjacent solid electrolyte layer 30 and the negative electrode current collectors 50A and 50B. Therefore, even when stacking, the shape of the outer surface of the adjacent all-solid secondary battery 1, specifically, the surface shapes of the negative electrode current collectors 50A and 50B, is easily affected. However, the all-solid secondary battery 1 according to the present embodiment employs the above-described negative electrode current collectors 50A and 50B in which unevenness is suppressed, so that it is possible to prevent the influence of the adjacent all solid secondary batteries 1 at the time of stacking.

The present disclosure is not limited to the above-described embodiment, and the negative electrode active material layer 40 may adopt any structure that may be used as the negative electrode active material layer of the all-solid secondary battery.

For example, in many cases, the negative electrode active material layer 40 may include a negative electrode active material, a solid electrolyte, and a negative electrode layer conducting agent.

In this case, for example, a metal active material or a carbon active material may be used as the negative electrode active material. As the metal active material, for example, a metal such as lithium (Li), indium (In), aluminum (Al), tin (Sn) and silicon (Si), alloys thereof, or a combination thereof, may be used. Further, as the carbon active material may include, for example, synthetic graphite, carbon fiber, resin fired carbon, pyrolysis vapor grown carbon, coke, mesocarbon microbeads (MCMB), furfuryl alcohol resin fired carbon, polyacene, pitch-based carbon fiber, vapor-grown carbon fiber, natural graphite, non-graphitizable carbon, or a combination thereof. These negative electrode active materials may be used alone, or may be used as a combination comprising at least one of the foregoing.

As the negative electrode layer conducting agent and the solid electrolyte, compounds such as a conducting agent and a solid electrolyte, contained in the positive electrode active material layer 20, may be used. Therefore, a detailed description of such a configuration will be omitted.

(Negative Electrode Current Collector)

Each of the negative electrode current collectors 50A and 50B is an outermost layer of a laminate of the all-solid second battery 1, which is disposed on the negative electrode active material layer 40. Each of the negative electrode current collectors 50A and 50B has the above-described surface shape.

Each of the negative electrode current collectors 50A and 50B may be a plate-like body or foil-like body made of copper (Cu), stainless steel, titanium (Ti), nickel (Ni), an alloy thereof, or a combination thereof.

[2.2. Multilayered all-Solid Secondary Battery]

Next, a multilayered all-solid secondary battery 100 according to the present embodiment will be described. The multilayered all-solid secondary battery 100 may include at least one insulating layer 110 and a plurality of all-solid secondary batteries 1 disposed such that the at least one insulation layer is interposed between the all-solid secondary batteries.

The plurality of all-solid secondary batteries 1 may be stacked such that a negative electrode current collector 50A of the all-solid secondary battery 1 of the multilayered all-solid secondary battery faces a negative electrode current collector 50B adjacent to the negative electrode current collector 50A. In this case, the plurality of all-solid secondary batteries 1 may be stacked without deteriorating the battery characteristics of each of the all-solid secondary batteries 1. Further, since the battery characteristics do not deteriorate even when the all-solid secondary batteries 1 are stacked such that the negative electrode current collector 50A of the all-solid secondary battery 1 faces the negative electrode current collector 50B adjacent to the negative electrode current collector 50A, three or more all-solid secondary batteries 1 may be stacked.

The insulating layer 110 is not particularly limited as long as it may insulate the adjacent all-solid secondary batteries 1. For example, the insulating layer 110 may be formed by coating the all-solid secondary battery with a thermoplastic resin sheet including polyethylene, polypropylene, polyvinyl chloride, polystyrene, polyurethane, or polytetrafluoroethylene, acrylic resin, a thermosetting resin such as phenol resin, epoxy resin, melamine resin, or urethane resin, an engineering plastic sheet such as polyethylene, polyamide, or polycarbonate, a synthetic rubber sheet such as silicone rubber or urethane rubber, a paper sheet, a resin, or a combination thereof.

The thickness of the insulating layer 110 is not particularly limited as long as it effectively insulates the adjacent all-solid secondary batteries 1, and may be, for example, about 0.1 µm to about 100 µm. For example, the thickness thereof may be about 0.5 µm to about 80 µm. For example, the thickness thereof may be about 1.0 µm to about 50 µm. When the thickness of the insulating layer 110 is within the above range, battery characteristics are not deteriorated, and three or more all-solid second batteries 1 may be stacked.

<3. Method of Manufacturing all-Solid Secondary Battery and Method of Multilayered all-Solid Secondary Battery>

Subsequently, a method of manufacturing all-solid secondary battery and a method of manufacturing multilayered all-solid secondary battery according to the present embodiment will be described as an example.

[3.1. Manufacturing of all-Solid Secondary Battery]

Figure 4:
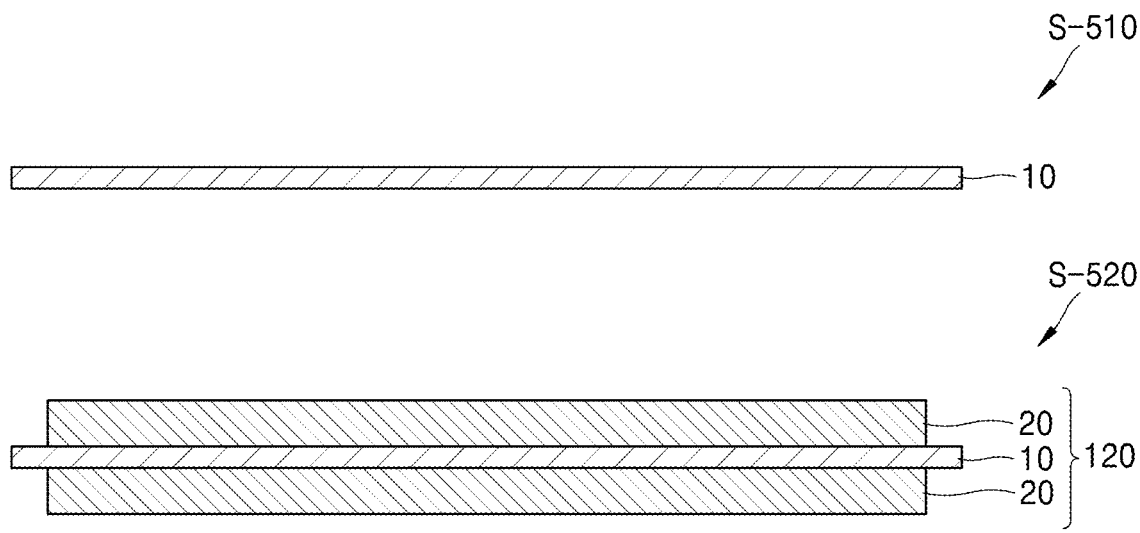
FIG. 4 is a schematic cross-sectional view illustrating a method of manufacturing a multilayered all-solid secondary battery, according to an embodiment.
Figure 5:
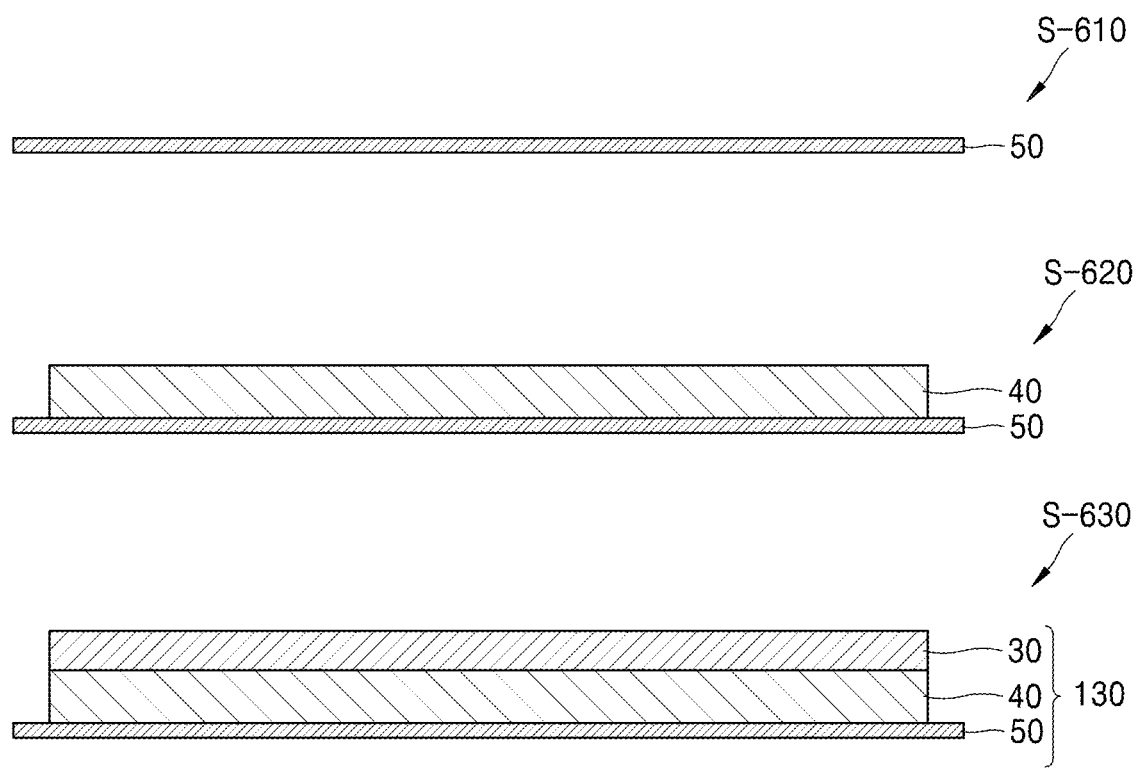
FIG. 5 is a schematic cross-sectional view illustrating a method of manufacturing a multilayered all-solid secondary battery according to an embodiment.
Figure 6:
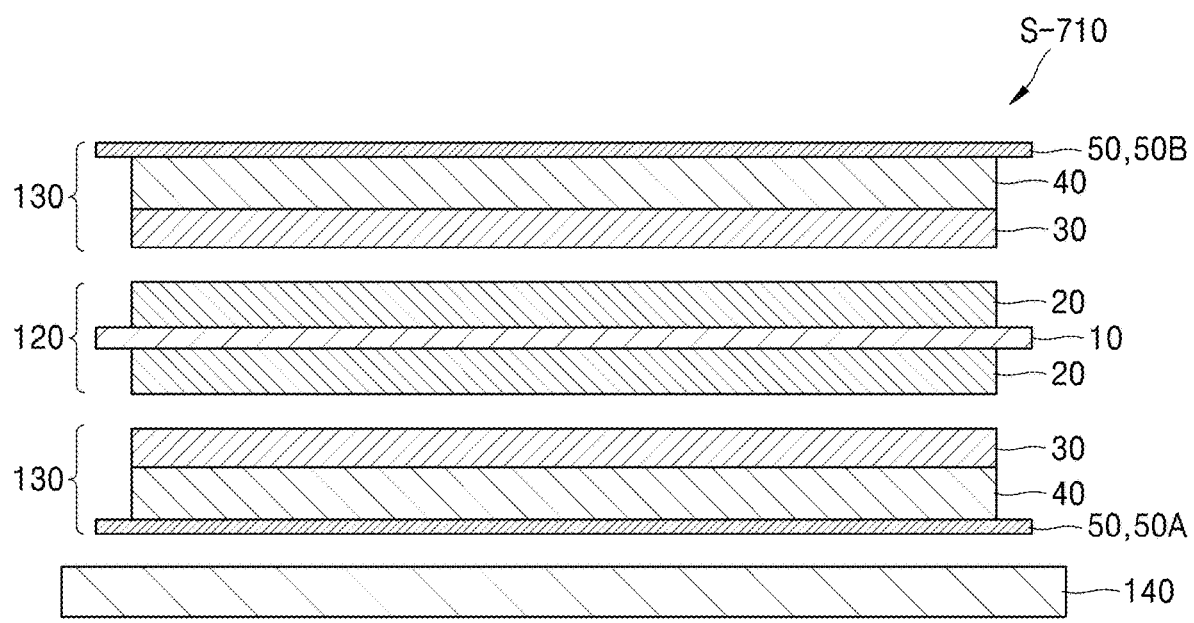
FIG. 6 is a schematic cross-sectional view illustrating a method of manufacturing a multilayered all-solid secondary battery, according to an embodiment.

First, a method of manufacturing all-solid secondary battery according to the present embodiment will be described as an example. FIGS. 4 to 6 are schematic cross-sectional views illustrating a method of manufacturing an all-solid secondary battery according to the present embodiment.

The method of manufacturing an all-solid secondary battery according to the present embodiment includes the processes of: forming a solid electrolyte layer 30 on a negative electrode active material layer 40 by screen printing; and disposing a lateral support (support plate) 140 on one side of a laminate in which a positive electrode current collector 10, a pair of positive electrode material layers 20, a pair of solid electrolyte layers 30, a pair of negative electrode active material layers 40, and a pair of negative electrode current collectors 50 are stacked, and isostatically pressing the laminate.

Further, in the present embodiment, specifically, a positive electrode structure 120 composed of the positive electrode current collector 10 and the positive electrode active material layers 20, and a solid electrolyte negative electrode composite 130 composed of the negative electrode current collector 50, the negative electrode active material 40, and the solid electrolyte layer 30 are separately prepared and then stacked.

(Preparation of Positive Electrode Structure)

The positive electrode structure 120 may be prepared by first providing a positive electrode current collector 10 (S-510) and then forming a positive electrode active material layer 20 on both sides of the positive electrode current collector 10 (S-520).

The positive electrode active material layer 20 may be formed by preparing a slurry or paste containing the materials of the positive electrode active material layer 20, applying the slurry or paste to both sides of the positive electrode current collector 10, and drying the slurry or paste. Specifically, the slurry or paste is prepared by combining the materials of the positive electrode active material layer 20, for example, a positive electrode active material, a solid electrolyte prepared by a method to be described later, and various additives to prepare a mixture, and then the mixture is added to a nonpolar solvent to prepare a slurry or paste. Then, the prepared slurry or paste is applied onto the positive electrode current collector 10, dried, and rolled to obtain the positive electrode structure 120. Alternatively, the obtained paste may be rolled without first being applied onto the positive electrode current collector 10 to obtain a positive electrode structure, and then the obtained positive electrode structure may integrated with the positive electrode current collector 10. Further, in order to increase the density of the positive electrode active material layer 20, a pressing process such as roll pressing may be performed as needed.

(Preparation of Solid Electrolyte Negative Electrode Composite)

The solid electrolyte negative electrode composite 130 may be prepared by first providing a negative electrode current collector 50 (S-610) and sequentially forming a negative electrode active material layer 40 and a solid electrolyte layer 30 on one side of the negative electrode current collector 50 (S-620 and S-630).

As the material of the negative electrode current collector 50, the above-described material of the negative electrode current collectors 50A and 50B may be used.

The negative electrode active material layer 40 may be formed by preparing a slurry or paste containing the materials of the negative electrode active material layer 40, applying the slurry or paste to the negative electrode current collector 50, and drying the slurry or paste. Specifically, the slurry or paste is prepared by combining the materials of the negative electrode active material layer 40, for example, a negative electrode active material, a binder, and various additives to prepare a mixture, and then the mixture is added to a nonpolar solvent to prepare a slurry or paste. The negative electrode active material layer 40 may be formed by applying the obtained slurry or paste onto the negative electrode current collector 50 and drying the applied slurry or paste. Alternatively, the negative electrode active material layer 40 may be formed by applying a negative electrode active material onto the negative electrode current collector 50 by sputtering. Further, a metal foil constituting the negative electrode active material layer 40 may be disposed on the negative electrode current collector 50.

Subsequently, a solid electrolyte layer 30 is formed on the negative electrode active material layer 40 by screen printing (S-630). Thus, large solid electrolyte particles may be removed, and the surface of the formed solid electrolyte layer may be smooth. Therefore, it is possible to prevent the negative electrode current collectors 50A and 50B, formed by the isostatic pressing to be described later, from being uneven.

Specifically, while examining the suppression of protrusions generated in the negative electrode current collectors 50A and 50B during isostatic pressing, it has been discovered that the shape of the solid electrolyte layer 30 has a significant impact on the surface shape of the negative electrode current collectors 50A and 50B, particularly, the surface shape of the negative electrode current collector 50B which is not in contact with a support plate 140. Further, as a result of additional examination to flatten the shape of the solid electrolyte layer 30, it was found that the unevenness of the solid electrolyte layer is increased by a method of forming only the solid electrolyte layer in the shape of a nonwoven fabric sheet. Further, the present inventors found that when the solid electrolyte layer 30 is directly formed on the negative electrode active material layer 40 by screen printing, thereby flattening the solid electrolyte layer 30, the influence of the solid electrolyte layer 30 on the surface shape of the negative electrode current collectors 50A and 50B is suppressed.

In the formation of the solid electrolyte layer 30, first, a solid electrolyte is provided. For this purpose, for example, the solid electrolyte may be obtained by treating a starting material of the solid electrolyte by a melt quenching method or a mechanical milling method.

For example, when the melt quenching method is used, a predetermined amount of starting materials (for example, $Li_2S$, $P_2S_5$, and the like) are mixed, pelletized, reacted at a predetermined reaction temperature, and then quenched to prepare a sulfide-based solid electrolyte material. The reaction temperature of the mixture of $Li_2S$ and $P_2S_5$ is for example, about 400° C. to about 1,000° C., and for example, about 800° C. to about 900° C. Further, the reaction time is for example, about 0.1 hours to about 12 hours, and for example, about 1 hour to about 12 hours. Further, the cooling temperature of the reaction product is generally at about 10° C. or less, and for example, about 0° C. or less. Further, the cooling rate is generally about 1° C. per second (/sec) to about 10,000° C./sec, and for example, about 1° C./sec to about 1,000° C./sec.

Meanwhile, when the mechanical milling method is used, starting materials (for example, $Li_2S$, $P_2S_5$, and the like) are combined, stirred, and reacted to prepare a sulfide-based solid electrolyte material. The stirring speed and stirring time in the mechanical milling method are not particularly limited. However, the faster the stirring speed, the faster the production speed of the sulfide-based solid electrolyte material, and the longer the stirring time, the greater the conversion rate of the starting material to the sulfide-based solid electrolyte material.

Thereafter, the mixed raw material obtained by the melt quenching method or the mechanical milling method is heat-treated at a predetermined temperature and pulverized to prepare a solid electrolyte in a particle state. When the solid electrolyte has a glass transition temperature, it may be changed from amorphous to crystalline by heat treatment.

Subsequently, a slurry-phase or paste-phase liquid composition is prepared including the solid electrolyte obtained as described above, other additives such as a binder, and a dispersion medium. As the dispersion medium, a general nonpolar solvent such as xylene or dimethylbenzene may be used. The concentration of the solid electrolyte and other additives may be appropriately adjusted depending on the final composition of the solid electrolyte layer 30 to be formed and the viscosity of the liquid composition.

Subsequently, a solid electrolyte layer 30 may be formed by applying the slurry-phase or paste-phase liquid composition including the solid electrolyte onto the negative electrode active material layer 40 by screen printing and then drying the applied liquid composition. In the screen printing, the number of screen meshes may be set at 60 to 300. When the number of screen meshes is too large, rough and large particles may not be removed, and when the number of screen meshes is too small, a good solid electrolyte layer may not be applied, although the number of screen meshes also depends on the particle size of the solid electrolyte and the viscosity of the liquid composition.

Thus, the solid electrolyte negative electrode composite 130 may be prepared. Further, if desired, the solid electrolyte negative electrode composite 130 may be subjected to a pressing process such as roll pressing.

(Stacking)

Subsequently, the obtained positive electrode structure 120 and solid electrolyte negative electrode composite 130 are stacked (S-710). As shown in FIG. 6, the stacking may be performed by arranging the solid electrolyte negative electrode composite 130 such that the solid electrolyte layer 30 faces the positive electrode active material layers 20 on both sides of the positive electrode structure 120. Further, at this time, a support plate 140 for isostatic pressing may be disposed on one side of the negative electrode current collector 50,50A.

(Isostatic Pressing)

Subsequently, the support plate 140 is disposed on at least one side of the obtained laminate, and isostatic pressing is performed (S-710). Thus, an all-solid secondary battery 1 may be obtained. Further, as a result of the isostatic pressing, the respective negative electrode collectors reflect the surface shapes of the respective layers to become negative electrode current collectors 50A and 50B.

The isostatic pressing is advantageous in terms of suppressing the formation of cracks in each layer in the all-solid secondary battery 1 and preventing the deformation of the all-solid secondary battery 1, as compared with other pressing methods such as roll pressing. Therefore, the performance of the all-solid secondary battery may be improved. Meanwhile, on the side of the laminate where the support plate 140 is not disposed, the surface shape of the negative electrode active material layer 40 and the solid electrolyte layer 30, particularly, the surface shape of the solid electrolyte layer 30, are easily reflected by the negative electrode current collectors 50A and 50B. However, in the present embodiment, the solid electrolyte layer 30 is formed directly on the negative electrode active material layer 40 by screen printing, and thus the surface shape of the solid electrolyte layer 30 is flat. Therefore, the occurrence of unevenness on the negative electrode current collector 50B is prevented.

Examples of the isostatic pressing medium may include a liquid such as water and oil, and a powder. Further, a liquid is used as the isostatic pressing medium.

The pressure applied in the isostatic pressing is not particularly limited, but may be, for example, about 10 megapascals (MPa) to about 1,000 MPa, and for example, about 100 MPa to about 500 MPa. The pressing time is not particularly limited, and may be, for example, about 1 minute to about 120 minutes, and for example, about 5 minutes to about 30 minutes. The temperature of the pressing medium during the isostatic pressing is not particularly limited, and may be, for example, about 20° C. to about 200° C., and for example, about 50° C. to about 100° C.

During the isostatic pressing, the laminate constituting the all-solid secondary battery 1 may be stacked together with a resin film by a resin film, and is blocked from external atmosphere.

[3.2. Manufacture of Multilayered all-Solid Secondary Battery]

Next, a multilayered all-solid secondary battery 100 is obtained by stacking a plurality of all-solid secondary batteries. At the time of stacking, the negative electrode current collector 50A of a first all-solid secondary battery 1 and the negative electrode current collector 50B of a second all-solid secondary battery 1 are disposed to face each other with the insulating layer 110 interposed between the first and second all-solid secondary batteries. Additional all-solid secondary batteries may also be stacked in a similar manner, with an insulating layer interposed between each of two adjacent all-solid secondary batteries. Thus, a relatively large number of, for example, three or more all-solid secondary batteries may be stacked together.

The all-solid secondary battery 1, the multilayered all-solid secondary battery 100, and the method of manufacturing the same according to the present embodiment have been described in detail. However, the present disclosure is not limited to the above embodiments.

For example, in the above embodiments, the first active material layer, the first current collector, the second active material layer, and the second current collector have been described as the positive electrode active material layer, the positive electrode current collector, the negative electrode active material layer, and the negative electrode current collector, respectively, but the present disclosure is not limited thereto. For example, the first active material layer may be a negative electrode active material layer, and the second active material layer may be a positive electrode active material layer. In this case, the first current collector may be a negative electrode current collector, and the second current collector may be a positive electrode current collector.

Further, in the above embodiments, the all-solid secondary battery was manufactured by separately preparing the positive electrode structure and the solid electrolyte negative electrode composite and stacking them, but the present disclosure is not limited thereto. For example, the positive electrode active material layers (first active material layers), solid electrolyte layers, negative electrode active material layers (second active material layers) and negative electrode collectors (second collectors) may be stacked on both sides of the positive electrode current collect (first current collector) in this order, thereby manufacturing the all-solid secondary battery.

EXAMPLES

Hereinafter, the present disclosure will be described in more detail with reference to the following examples. However, these embodiments are set forth to illustrate the present disclosure, and the scope of the present disclosure is not limited thereto.

Example 1

[Preparation of Positive Electrode Structure]

Three-component powder including $LiNi_{0.8}Co_{0.15}Al_{0.05}O_2$ (NCA) as a positive electrode active material, an amorphous powder of $Li_2S$—$P_2S_5$ (mole ratio: 80:20) as a sulfide-based solid electrolyte, and a vapor-grown carbon fiber powder as a positive layer conducting material (conducting agent) were combined at a weight ratio of 60:35:5, and mixed using a revolving mixer.

Next, a dehydrated xylene solution in which SBR was dissolved as a binder was added to the mixed powder such that the content of SBR is 5.0 wt % with respect to the total weight of the mixed powder, so as to obtain a primary mixture. Further, a suitable amount of dehydrated xylene for viscosity adjustment was added to the obtained primary mixture to produce a secondary mixture. Moreover, in order to improve the dispersability of the mixed powder, zirconia balls having a diameter 5 mm were added to the secondary mixture such that the volume of each of space, mixed powder, and zirconia balls occupies ⅓ of the total volume of a kneading container, so as to obtain a tertiary mixture. The tertiary mixture obtained in this way was put into a revolving mixer, and stirred at 3,000 rpm for 3 minutes, to obtain a coating solution for a positive electrode active material layer.

Subsequently, an aluminum foil current collector having a thickness of 20 μm was provided as a positive electrode current collector and placed in a desktop screen printing press, the aluminum foil current collector was coated with the coating solution for a positive electrode active material layer by using a metal mask having a thickness of 150 μm and a diameter of 2.0 cm×2.0 cm, and then the aluminum foil current collector coated with the coating solution was dried by a hot plate at 60° C. for 30 minutes. Subsequently, the back surface of the aluminum foil current collector was also coated with the coating solution for a positive electrode active material layer, and dried by a hot plate at 60° C. for 30 minutes. Subsequently, the coated aluminum foil current collector was also vacuum-dried at 80° C. for 12 hours. Thus, positive electrode active material layers were formed on both sides of the positive electrode current collector to obtain a positive electrode structure. The total thickness of the positive electrode structure after drying was about 330 μm.

[Preparation of Negative Electrode Structure]

An aluminum foil current collector having a thickness of 10 μm was provided as a negative electrode current collector. Further, as negative electrode active materials, CB1 (amorphous carbon, nitrogen adsorption specific surface area of about 339 m²/g, DBP supply amount of about 193 mL/100 g) manufactured by ASAHI CARBON CO., LTD., CB2 (amorphous carbon, nitrogen adsorption specific surface area of about 52 m²/g, DBP supply amount of about 193 ml/100 g) manufactured by ASAHI CARBON CO., LTD., and silver particles having a particle size of about 3 μm (particle size was measured by the above method) were provided.

Subsequently, 1.5 g of CB1, 1.5 g of CB2, and 1 g of silver particles were put into a container, and 4 g of an N-methylpyrrolidone (NMP) solution including 5 wt % of a polyvinylidene fluoride (PVdF) binder (#9300, manufactured by KUREHA CORPORATION) was additionally put into the container, so as to obtain a mixed solution. Subsequently, this mixed solution was stirred while adding a total amount of 30 grams (g) of NMP to the mixed solution little by little, so as to prepare a slurry. This slurry was applied onto a nickel foil current collector using a blade coater, and was dried in the air at 80° C. for 20 minutes, to obtain a laminate. The laminate obtained in this way was vacuum-dried at 100° C. for 20 minutes. Through the above processes, a negative electrode structure in which the negative electrode active material layer is stacked on the negative electrode current collector was manufactured.

[Preparation of Solid Electrolyte Negative Electrode Composite]

An SBR binder dissolved in dehydrated xylene was added to an amorphous powder of $Li_2S$—$P_2S_5$ (mole ratio: 80:20) as a sulfide-based solid electrolyte such that the content of the SBR binder is 1.0 wt % with respect to the total weight of the solid electrolyte, so as to obtain a primary mixture. Further, a suitable amount of dehydrated xylene and dehydrated dimethylbenzene for viscosity adjustment were added to the primary mixture to produce a secondary mixture. Moreover, in order to improve the dispersability of the mixed powder, zirconia balls having a diameter 5 mm were added to the secondary mixture such that the volume of occupied by space, mixed powder, and zirconia balls is ⅓ of the total volume of a kneading container, so as to obtain a tertiary mixture. The tertiary mixture obtained in this way was put into a revolving mixer, and stirred at 3,000 rpm for 3 minutes, to obtain a coating slurry for a solid electrolyte layer.

Subsequently, a negative electrode structure was disposed in a desktop screen printing press, and the negative electrode structure was coated with the coating slurry for a solid electrolyte layer using a metal screen (80 meshes, diameter of about 50 μm, thickness of about 100 μm). Thereafter, the coating slurry for a solid electrolyte layer was dried by a hot plate at 50° C. for 10 minutes, and then vacuum-dried at 40° C. for 12 hours, so as to form a solid electrolyte layer. The total thickness of the solid electrolyte layer after drying was about 90 μm. Thus, a solid electrolyte negative electrode composite, in which a solid electrolyte layer was formed on the negative electrode structure, was obtained.

[Preparation of all-Solid Secondary Battery]

A sheet-shaped solid electrolyte negative electrode composite and a sheet-shaped positive electrode structure including positive active material layers formed on both sides of a positive electrode current collector were respectively cut by a Thomson knife, and then the solid electrolyte negative electrode composite, the positive electrode structure, and the solid electrolyte negative electrode structure were stacked in this order such that the solid electrolyte layers are in contact with the positive active material layers on both sides of the positive electrode structure, so as to obtain a laminate. In this state, the obtained laminate was placed in an aluminum laminate film, vacuum exhaustion was performed to 100 pascals (Pa) with a vacuum machine, and laminate packing was carried out.

Subsequently, the resulting laminate was placed on an aluminum plate (support plate) having a thickness of 3 mm, and vacuum laminate packing was carried out together with the support plate. This resulting product was put into a pressing medium, and isostatic pressing treatment (compacting process) at 490 MPa was carried out. During the isostatic pressing treatment, the temperature of the pressing medium was about 80° C., and the treatment time was about 30 minutes. Thus, an all-solid second battery was manufactured as a single cell. In this case, the negative current collecting foil of the solid electrolyte negative electrode composite, contacting the aluminum plate, will be referred to as "A plane", and the opposite negative current collecting foil is referred to as "B plane".

In the obtained all-solid secondary battery, the initial charging capacity "b" of the positive electrode active material layer was 778 mAh, and the initial charging capacity "a" of the negative electrode active material layer was 99 mAh. Therefore, the b/a in Formula (1) was 0.13.

[Preparation of Multilayered all-Solid Secondary Battery]

Two single cells of the prepared all-solid secondary battery were insulated from each other. Specifically, the two all-solid secondary batteries were stacked such that the A plane of one all-solid secondary battery faces the B plane of the other all-solid secondary battery with an insulating layer interposed therebetween, the laminate was placed in an aluminum laminate film, vacuum exhaustion was performed to 100 Pa with a vacuum machine, and then laminate packing was carried out, thereby manufacturing a multilayered all-solid secondary battery according to Example 1.

Comparative Example 1

A multilayered all-solid secondary battery according to Comparative Example 1 was manufactured in the same manner as in Example 1, except that the application of a solid electrolyte slurry onto a negative electrode structure at the time of forming a solid electrolyte layer was performed by using a rubber roller and a metal mask (thickness of 60 μm) instead of screen printing.

Comparative Example 2

First, a positive electrode structure and a negative electrode structure were fabricated in the same manner as in Example 1. Next, the solid electrolyte slurry obtained in the same manner as in Example 1 was applied onto a polyethylene nonwoven fabric having a thickness of 10 μm and fixed on a polyethylene substrate having a thickness of 75 μm, dried by a hot plate at 50° C. for 10 minutes, and then vacuum-dried at 40° C. for 12 hours, so as to obtain a solid electrolyte layer.

Subsequently, the solid electrolyte layer, the negative electrode composite, and the positive electrode structure were respectively cut by a Thomson knife, and then the solid electrolyte layers and the negative electrode structures were sequentially stacked on both sides of the positive electrode structure. Further, the negative electrode structures were stacked such that the negative electrode active material layer is in contact with the solid electrolyte layer.

Thereafter, laminate packing and isostatic pressing treatment were performed in the same manner as described in Example 1 to obtain a multilayered all-solid secondary battery according to Comparative Example 2.

Reference Example 1

A multilayered all-solid secondary battery according to Reference Example 1 was manufactured in the same manner as in Comparative Example 2, except that two single cells of an all-solid secondary battery were insulated from each other. Specifically, two all-solid secondary batteries were stacked such that the A plane of one all-solid secondary battery faces the B plane of the other all-solid secondary battery with an insulating layer interposed therebetween.

<Evaluation>

(Surface Characteristics and Shapes of Negative Electrode Current Collector)

The surface characteristics and shapes of negative electrode current collectors constituting the multilayered all-solid secondary batteries according to Example 1, Comparative Examples 1 and 2, and Reference Example 1 were evaluated as described below by using a non-contact, curved surface fine shape optical measurement system VR-3200 of KEYENCE CORPORATION.

Five points of the negative electrode current collector of the all-solid secondary battery were observed with a view range of 12 mm×9 mm (108 mm$^2$=1.08 cm$^2$) using a 25 times power magnification lens, and then a reference plane was set based on the three-dimensional shape information obtained from the three-dimensional shape measurement data. In the area for setting the reference plane, the reference plane is set by selecting the entire measured area and estimating the plane by the least squares method in the area of the designated height image shape. After correcting the reference plane, the surface roughness in the cross-sectional direction was checked. The number of protrusions having a height of 5 μm to 8 μm and greater than 8 μm on the plane A, and the number of protrusions having a height of 8 μm to 10 μm and greater than 10 μm on the plane B, were detected. Further, the height of the protrusion was defined as a difference in the height from the top point to the lowest point among the points where the width in monotonic decrease from the height at the top point becomes negative.

(Battery Performance Evaluation)

The short-circuiting and cycle characteristics of the multilayered all-solid secondary batteries according to Example 1, Comparative Examples 1 and 2, and Reference Example 1 were evaluated as follows. First, the multilayered all-solid secondary battery was interposed between two upper and lower metal plates, and the metal plates were tightened by inserting screws with springs into holes formed in the metal plates such that the pressure applied to the battery was 3.0 MPa. Next, after charging to a maximum voltage of 4.25 volts (V) at a constant current of 0.1 C at 60° C., constant voltage charging (0.1 C, constant current constant voltage (CCCV) charging) was carried out until a current value reaches 33% at the constant current, and discharging was carried out to a discharging end voltage of 2.0 V. Next, 0.1 C CCCV was charged, 0.33 C was discharged, and further, 0.1 C CCCV was charged and 1 C was discharged. Subsequently, charging and discharging cycles of charging the battery up to a maximum voltage of 4.25 V (charging 0.5 C CC) at a constant current of 0.5 C and discharging the battery to a discharge end voltage of 2.0 V at 0.5 C were repeated, and the results thereof were measured by a charge/discharge evaluation device TOSCAT-3100 (Dongyang System Co., Ltd.).

When a cut-off voltage reaches 0.1 C CCCV and charge-discharge efficiency is 0.90 or more, the short-circuiting was evaluated as "A", and when a cut-off voltage does not reach 0.1 C CCCV and charge-discharge efficiency is less than 0.90, the short-circuiting was evaluated as "B".

Further, when a discharge capacity retention rate after 10 cycles from 0.5 C discharge is 95% or more, the cycle characteristics were evaluated as "A", and when the discharge capacity retention rate after 10 cycles is less than 95%, the cycle characteristics were evaluated as "B".

The results thereof are given in Table 1.

TABLE 1

| | Facing planes in negative electrode current collector | A plane The number of protrusions (/cm$^2$) | | B plane The number of protrusions (/cm$^2$) | | Battery performance | | Stacking of three or more layers |
|---|---|---|---|---|---|---|---|---|
| | | Greater than 5 μm and 8 μm or less | Greater than 8 μm | Greater than 8 μm and 10 μm or less | Greater than 10 μm | Short circuiting during charging | Cycle characteristics | |
| Example 1 | A plane – B plane | 0 | 0 | 0.74 | 0 | A | A | Possible |
| Comparative Example 1 | A plane – B plane | 0 | 0 | 1.5 | 0.74 | B | B | Impossible |
| Comparative Example 2 | A plane – B plane | 0 | 0 | 5.4 | 3.0 | B | A | Impossible |
| Reference Example 1 | A plane – A plane | 0 | 0 | 5.0 | 3.3 | A | A | Impossible |

As shown in Table 1, the multilayered all-solid secondary battery according to Example 1, similar to Reference Example 1, has excellent cycle characteristics. The multilayered all-solid secondary battery according to Example 1 is also prevented from short-circuiting. Meanwhile, unlike Reference Example 1, in Example 1 during isostatic pressing, stacking may be performed by facing the A plane in contact with the support plate and the B plane not in contact with the support plate, so that three or more all-solid secondary batteries may be stacked. Further, protrusions having a height of 5.0 μm or greater were not observed on the A plane of the all-solid secondary battery according to Example 1.

In contrast, the all-solid secondary battery according to Comparative Example 1 causes short-circuiting, and has poor cycle characteristics, and the all-solid secondary battery according to Comparative Example 2 also causes short-circuiting, As described above, according to the present disclosure, there may be provided a new and improved all-solid secondary battery capable of being stacked as a plurality of batteries without deteriorating battery characteristics, a multilayered all-solid secondary battery obtained by stacking the all-solid secondary batteries, and a method of manufacturing the all-solid secondary battery.

It should be understood that embodiments described herein should be considered in a descriptive sense only and not for purposes of limitation. Descriptions of features or aspects within each embodiment should be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. An all-solid secondary battery, comprising:
   a first current collector;
   a pair of first active material layers respectively disposed on opposite sides of the first current collector;
   a pair of solid electrolyte layers respectively disposed on surfaces of the pair of first active material layers, wherein the surfaces of the pair of first active material layers are each opposite to a surface of the first current collector;
   a pair of second active material layers respectively disposed on surfaces of the pair of solid electrolyte layers, wherein the surfaces of the pair of solid electrolyte layers are each opposite to a surface of the pair of first active material layers; and
   a pair of second current collectors respectively disposed on surfaces of the pair of second active material layers, wherein the surfaces of the pair of second active material layers are each opposite to a surface of the pair of solid electrolyte layers,
   wherein a surface of one of the pair of second current collectors that is opposite to a surface of one of the pair of second active material layers, does not comprise protrusions having a height of greater than about 8 micrometers, and
   wherein a surface of the other one of the pair of second current collectors that is opposite to a surface of the other one of the pair of second active material layers, comprises protrusions having a height of greater than about 8 micrometers at a content of greater than 0 to about 1 protrusion per square centimeter.

2. The all-solid secondary battery of claim 1, wherein the surface of the one of the pair of second current collectors does not comprise protrusions having a height of greater than about 5 micrometers.

3. The all-solid secondary battery of claim 1, wherein the surface of the other one of the pair second current collectors does not comprise protrusions having a height of greater than about 10 micrometers.

4. The all-solid secondary battery of claim 1, wherein each one of the pair of first active material layers is a positive electrode active material layer, and each one of the pair of second active material layers is a negative electrode active material layer.

5. The all-solid secondary battery of claim 4, wherein the positive electrode active material layer comprises a positive electrode active material and a solid electrolyte.

6. The all-solid secondary battery of claim 4, wherein the positive electrode active material layer comprises a lithium salt of a transition metal oxide having a layered rock salt type structure.

7. The all-solid secondary battery of claim 4, wherein the positive electrode active material layer comprises a compound represented by $LiNi_xCo_yAl_zO_2$ or $LiNi_xCo_yMn_zO_2$, wherein $0<x<1$, $0<y<1$, $0<z<1$, and $x+y+z=1$.

8. The all-solid secondary battery of claim 1, wherein each one of the pair of second active material layers comprises a negative electrode active material which forms an alloy with lithium and a negative electrode active material which forms a compound with lithium, or a combination thereof, and
   lithium metal precipitates on each one of the pair of second active material layers through the negative electrode active material during charging.

9. The all-solid secondary battery of claim 1, wherein a ratio of a charging capacity of one of the pair of first active material layers to a charging capacity of one of the pair of second active material layers is represented by Formula (1) below:

$$0.002<b/a<0.5, \qquad \text{Formula (1)}$$

wherein, a is a charging capacity of the one of the pair of first active material layers, and b is a charging capacity of the one of the pair of second active material layers.

10. The all-solid secondary battery of claim 1, wherein each one of the pair of second active material layers amorphous carbon, gold, platinum, palladium, silicon, silver, aluminum, bismuth, tin, zinc, or a combination thereof.

11. The all-solid secondary battery of claim 1, wherein each one of the pair of second active material layers comprises a binder.

12. The all-solid secondary battery of claim 11, wherein the binder comprises styrene butadiene rubber, polytetrafluoroethylene, polyvinylidene fluoride, polyethylene oxide, or a combination thereof.

13. The all-solid secondary battery of claim 1, wherein each one of the pair of solid electrolyte layers comprises a sulfide-containing solid electrolyte material.

14. The all-solid secondary battery of claim 1, wherein each one of the pair of solid electrolyte layers comprises a solid electrolyte comprising sulfur, silicon, phosphorus, boron, or a combination thereof.

15. The all-solid secondary battery of claim 1, wherein each one of the pair of second current collectors comprises copper, stainless steel, titanium, nickel, an alloy thereof, or a combination thereof.

16. A multilayered all-solid secondary battery, comprising:
   at least one insulating layer; and
   a plurality of the all-solid secondary batteries of claim 1,
   wherein the plurality of the all-solid secondary batteries is disposed such that the at least one insulating layer is interposed between the all-solid secondary batteries,
   wherein the all-solid secondary batteries are disposed such that one of the pair of second current collectors of one of the plurality of all-solid secondary batteries faces one of the pair of the second current collectors of another one of the all-solid secondary batteries.

17. The multilayered all-solid secondary battery of claim 16,
   wherein the at least one insulating layer comprises polyethylene, polypropylene, polyvinyl chloride, polystyrene, polyurethane, polytetrafluoroethylene, acrylic resin, phenol resin, epoxy resin, melamine resin, urethane resin, polyamide, polycarbonate, silicon rubber, urethane rubber, paper, or a combination thereof.

18. The multilayered all-solid secondary battery of claim 16,
   wherein the at least one insulating layer has a thickness of about 0.1 micrometers to about 100 micrometers.

19. A method of manufacturing an all-solid secondary battery, comprising a first current collector, a pair of first active material layers disposed on opposite sides of the first current collector, a pair of solid electrolyte layers disposed on opposite sides of the first current collector and on surfaces of the pair of first active material layers, wherein the surfaces of the pair of first active material layers are each opposite to a surface of the first current collector, a pair of second active material layers on opposite sides of the first current collector and on surfaces of the pair of solid electrolyte layers, wherein the surfaces of the pair of solid electrolyte layers are each opposite to a surface of one of the pair of first active material layers, and a pair of second current collectors disposed on opposite sides of the first current collector and on surfaces of the pair of second active material layers, wherein the surfaces of the pair of second active material layers are each opposite to one of the pair of solid electrolyte layers, the method comprising:
   forming each one of the pair of solid electrolyte layers on one of the pair of first active material layers or on one of the pair second active material layers; and
   disposing a support on a side of a laminate in which the first current collector, the pair of first active material layers, the pair of solid electrolyte layers, the pair of second active material layers, and the pair of second current collectors are stacked, and
   isostatically pressing the laminate.

20. The method of claim 19,
   wherein the isostatic pressing of the laminate comprises applying a pressure of about 10 megapascals to about 1000 megapascals for about 1 minute to about 120 minutes.

* * * * *